(12) United States Patent
Gur et al.

(10) Patent No.: US 10,552,147 B2
(45) Date of Patent: Feb. 4, 2020

(54) OVER THE AIR UPDATES USING DRONES

(71) Applicant: Red Bend Ltd., Hod-HaSharon (IL)

(72) Inventors: Eli Gur, Binyamina (IL); Sagi Ben Akiva, Tel Aviv (IL)

(73) Assignee: Red Bend Ltd., Hod-Hasharon (IL)

( * ) Notice: Subject to any disclaimer, the term of this patent is extended or adjusted under 35 U.S.C. 154(b) by 78 days.

(21) Appl. No.: 15/722,988

(22) Filed: Oct. 2, 2017

(65) Prior Publication Data
US 2019/0102164 A1 Apr. 4, 2019

(51) Int. Cl.
G06F 9/44 (2018.01)
G06F 8/658 (2018.01)
H04L 29/08 (2006.01)

(52) U.S. Cl.
CPC .............. G06F 8/658 (2018.02); H04L 67/34 (2013.01)

(58) Field of Classification Search
None
See application file for complete search history.

(56) References Cited

U.S. PATENT DOCUMENTS

| 9,536,216 | B1 | 1/2017 | Lisso | |
| 9,830,166 | B2 * | 11/2017 | Zhang | G06F 9/4484 |
| 2014/0277854 | A1 | 9/2014 | Jones et al. | |
| 2016/0292403 | A1 * | 10/2016 | Gong | G06F 16/29 |
| 2016/0308957 | A1 * | 10/2016 | Zhang | G06F 9/4484 |
| 2016/0321081 | A1 * | 11/2016 | Kim | G06F 9/441 |
| 2016/0364223 | A1 | 12/2016 | Vandikas et al. | |
| 2017/0195459 | A1 * | 7/2017 | e Costa | H04L 67/34 |
| 2017/0359237 | A1 * | 12/2017 | Hao | H04L 67/02 |
| 2017/0364349 | A1 * | 12/2017 | Conant | H04W 4/80 |
| 2018/0034936 | A1 * | 2/2018 | Correia e Costa | H04L 67/34 |
| 2018/0063286 | A1 * | 3/2018 | Braga Ameixieira | H04L 67/34 |
| 2018/0300123 | A1 * | 10/2018 | Willis | G06F 8/658 |
| 2018/0336024 | A1 * | 11/2018 | Klische | G06F 8/65 |
| 2019/0042227 | A1 * | 2/2019 | Sharma | G06F 8/65 |

OTHER PUBLICATIONS

European Search Report and the European Search Opinion dated Mar. 26, 2018 From the European Patent Office Re. Application No. 17194328.5. (8 Pages).

* cited by examiner

*Primary Examiner* — Insun Kang
(74) *Attorney, Agent, or Firm* — Gordon & Rees LLP

(57) ABSTRACT

A computer implemented method of using a drone to provide update packages to embedded devices, comprising using one or more processors mounted on the drone for executing a code for maneuvering the drone to be in range of one or more wireless interfaces of each of a plurality of embedded devices, communicating with each embedded device through the wireless interface(s) to identify one or more attributes of each embedded device, selecting one of a plurality of update packages according to the identified attribute(s) and transmitting the selected update package to the each embedded device through the wireless interface(s).

19 Claims, 2 Drawing Sheets

OVER THE AIR UPDATES USING DRONES

BACKGROUND

Some embodiments described herein relate to providing update packages to embedded devices, and, more specifically, but not exclusively, to providing update packages to embedded devices using a drone.

Internet of Things (IoT) has become a rapidly evolving paradigm in recent years. As such, multiple types of embedded devices having network connectivity are deployed for a plurality of applications ranging from home use, vehicle control through agriculture, water industries and other industrial applications to weather prediction, environmental and earth conservation applications.

Functionality of such embedded devices is also constantly increasing through software, firmware, middleware and/or the like and/or non-executable data such as map data and/or the like executed or used by processing resources integrated in the embedded devices. The software, firmware, middleware and/or data which are typically programmed into a persistent memory of the embedded devices may require updates after the embedded devices are deployed for a plurality of reasons, for example, increase functionality, add features, adapt to new operational conditions, resolve bugs, apply cyber security measures and/or the like.

SUMMARY

According to a first aspect described herein there is provided a computer implemented method of using a drone to provide update packages to embedded devices, comprising using one or more processors mounted on the drone for executing a code for:
  Maneuvering the drone to be in range of one or more wireless interfaces of each of a plurality of embedded devices.
  Communicating with each of the embedded devices through the one or more wireless interfaces to identify one or more attributes of each of the embedded devices.
  Selecting one of a plurality of update packages according to the identified attribute(s).
  Transmitting the selected update package to each embedded device through the wireless interface(s).

Using the drone may overcome limitations and/or obstacles which may jeopardize providing embedded devices with update package(s) for updating executable (e.g. software, firmware, middleware, etc.) and/or non-executable modules (e.g. data) executed and/or used by the embedded devices. The wireless interface(s) of the embedded devices may typically support limited connectivity inherent by the limited capabilities of the embedded devices (e.g. low power, limited functionality, limited processing resources, limited communication resources, etc.). In addition, some of the embedded devices may be deployed in limited network coverage areas. The limited communication resources and/or limited network connectivity may be insufficient for transmitting the update packages to the embedded devices. As the drone may be maneuvered to be within range of the embedded devices' wireless interface, the drone may gain improved connectivity to the embedded devices to allow for providing the update packages.

Moreover, the drone may be operated to provide the update packages to a plurality of target embedded devices during a single flight to reduce costs and complexity of the update process.

In addition, there may be scenarios in which the network connectivity of the embedded devices through a gateway and/or a backend service infrastructure may be compromised by cyber threat(s). The drone may be used to bypass the gateway and/or a backend service and provide the update package(s) directly to the embedded devices.

According to a second aspect described herein there is provided a system for using a drone to provide update packages to embedded devices, comprising one or more processors mounted on a drone. The processor(s) is adapted to execute a code, the code comprising:
  Code instructions to maneuver the drone to be in range of one or more wireless interfaces of each of a plurality of embedded devices.
  Code instructions to communicate with each of the embedded devices through the one or more wireless interfaces to identify one or more attributes of each of the embedded devices.
  Code instructions to select one of a plurality of update packages according to the identified attribute(s).
  Code instructions to transmit the selected update package to each embedded device through the wireless interface(s).

In a further implementation form of the first and/or second aspects, each of the plurality of embedded devices is a member of a group comprising: an Internet of Things (IoT) device, a sensor, a meter, a road infrastructure element, an agricultural control device, an industrial control device and a vehicle deployed device. The drone may be used to provide the update package(s) to a plurality of embedded devices thus supporting a plurality of deployments and applications.

In a further implementation form of the first and/or second aspects, each of the attributes is a member of a group comprising: a type, a variant, a vendor, a software version and a communication capability of the one or more wireless interfaces. Identifying the exact attribute(s) of each embedded device and selecting the appropriate update package according to these identified attribute(s) may allow for providing the exact update package designed, configured and designated for each of the embedded devices. Moreover, large universal update package may be avoided since small efficient update packages may be selected specifically for each of the embedded devices.

In a further implementation form of the first and/or second aspects, the update package is a member of a group consisting of: a full version update and a differential update. This may allow adapting to the update capabilities of each of the embedded devices. In particular, some of the lower end embedded devices may support flashing their entire memory image thus requiring a full version update while other higher end embedded devices may be able to receive and apply differential updates.

In a further implementation form of the first and/or second aspects, the selected update package is obtained from a local storage resource of the drone. The drone may be pre-loaded with the update packages, specifically according to the attributes of the target embedded devices planned to be updated during the update flight. Moreover, the drone may be pre-loaded with the update packages according to the attributes of the target embedded devices deployed along the flight route.

In a further implementation form of the first and/or second aspects, the selected update package is obtained from a remote storage resource over one or more long range wireless interfaces of the drone. While in close proximity to the embedded device(s) (i.e. in wireless interface range), the drone may first identify the attribute(s) of the embedded device(s) and obtain an appropriate update package accordingly. This may facilitate the ability to provide update package which were not pre-loaded to the drone.

In a further implementation form of the first and/or second aspects, the update package is obtained from a shared repository storing a plurality of update packages for at least some of the plurality of embedded devices. A shared repository may significantly simplify the access made by the drone to obtain the update packages relieving the drone from accessing separate storage resources to obtain the update packages for different embedded devices supported by different vendors.

In an optional implementation form of the first and/or second aspects, each of the plurality of update packages is provided by a respective vendor independently of other update packages of the plurality of update packages. The repository may be maintained asynchronously such that each vendor may store his update packages independently of other vendors as well. The vendors may also store their respective update packages with no relation to the scheduled update sessions of the drone. As such, the drone may obtain the latest update package currently available in the repository for each of the embedded devices.

In an optional implementation form of the first and/or second aspects, a flight route of the drone is optimized according to an estimated update session time for providing the update package to one or more of the plurality of embedded devices. Optimizing the flight route may significantly reduce the operational costs for operating the drone to provide the update packages to the embedded devices.

In a further implementation form of the first and/or second aspects, the processor(s) is further configured to provide simultaneously respective selected update package(s) to multiple embedded devices of the plurality of embedded devices by maneuvering the drone to be within range of the wireless interface(s) of the multiple embedded devices and communicating simultaneously with the multiple embedded devices to provide the respective selected update package to each of the multiple embedded devices. Simultaneously providing (transmitting) the update package(s) to multiple embedded devices may shorten the update session thus further reducing the operational costs for operating the drone.

In an optional implementation form of the first and/or second aspects, the transmitting comprises broadcasting the selected update package such that the selected update package is received by multiple embedded devices. Broadcasting the update package may further shorten the update session thus reducing the operational costs for operating the drone.

In an optional implementation form of the first and/or second aspects, the update package is encrypted prior to the transmitting of the update package. Encryption may improve security and/or immunity of the embedded devices to potentially malicious cyber-attacks which may be initiated through compromised update packages.

In an optional implementation form of the first and/or second aspects, an identity of the drone is provided to one or more of the embedded devices as part of an authentication session. Each of the one or more embedded devices validates the identity according to authentication data obtained from a remote secure resource. Authenticating the identity of the drone by the embedded device may further improve security and/or immunity of the embedded devices to potentially malicious cyber-attacks which may be initiated using malicious drones.

In an optional implementation form of the first and/or second aspects, operational information is collected from one or more of the embedded devices. While in range of the wireless interface of the embedded device(s) during the update session, the drone may collect operational information and/or data accumulated at the embedded device. This may allow obtaining the operational information while reducing the communication sessions the embedded device(s) holds with their gateway and/or backend service as well as overcome failures in such gateways and/or backend services.

In a further implementation form of the first and/or second aspects, the collected operational information is transmitted to one or more remote operational centers over one or more long range wireless interfaces of the drone. This may allow immediate transfer of the operational information and/or data collected from the embedded device to the to the operational data center(s). This may be of particular value in case of critical operational data and/or in case further interaction may be required between the data center(s) and the embedded devices based on the collected operational information. Such interaction may be supported by the drone.

In a further implementation form of the first and/or second aspects, the collected operational information is stored in a storage resource of the drone and uploaded to one or more remote locations at a later time. This may allow providing the operational information and/or data collected from the embedded device to the operational data center(s) offline after the drone arrives the service area to avoid excessive and potentially unnecessary (in case of non-critical operational data) transmissions between the drone and the operational data center(s) while the drone is air borne.

Unless otherwise defined, all technical and/or scientific terms used herein have the same meaning as commonly understood by one of ordinary skill in the art to which the embodiment describe herein pertains. Although methods and materials similar or equivalent to those described herein can be used in the practice or testing of embodiments of the embodiment describe herein, exemplary methods and/or materials are described below. In case of conflict, the patent specification, including definitions, will control. In addition, the materials, methods, and examples are illustrative only and are not intended to be necessarily limiting.

Implementation of the method and/or system of embodiments described herein can involve performing or completing selected tasks manually, automatically, or a combination thereof. Moreover, according to actual instrumentation and equipment of embodiments of the method and/or system described herein, several selected tasks could be implemented by hardware, by software or by firmware or by a combination thereof using an operating system.

For example, hardware for performing selected tasks according to embodiments described here could be implemented as a chip or a circuit. As software, selected tasks according to embodiments described herein could be implemented as a plurality of software instructions being executed by a computer using any suitable operating system. In an exemplary embodiment, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments are described herein, by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
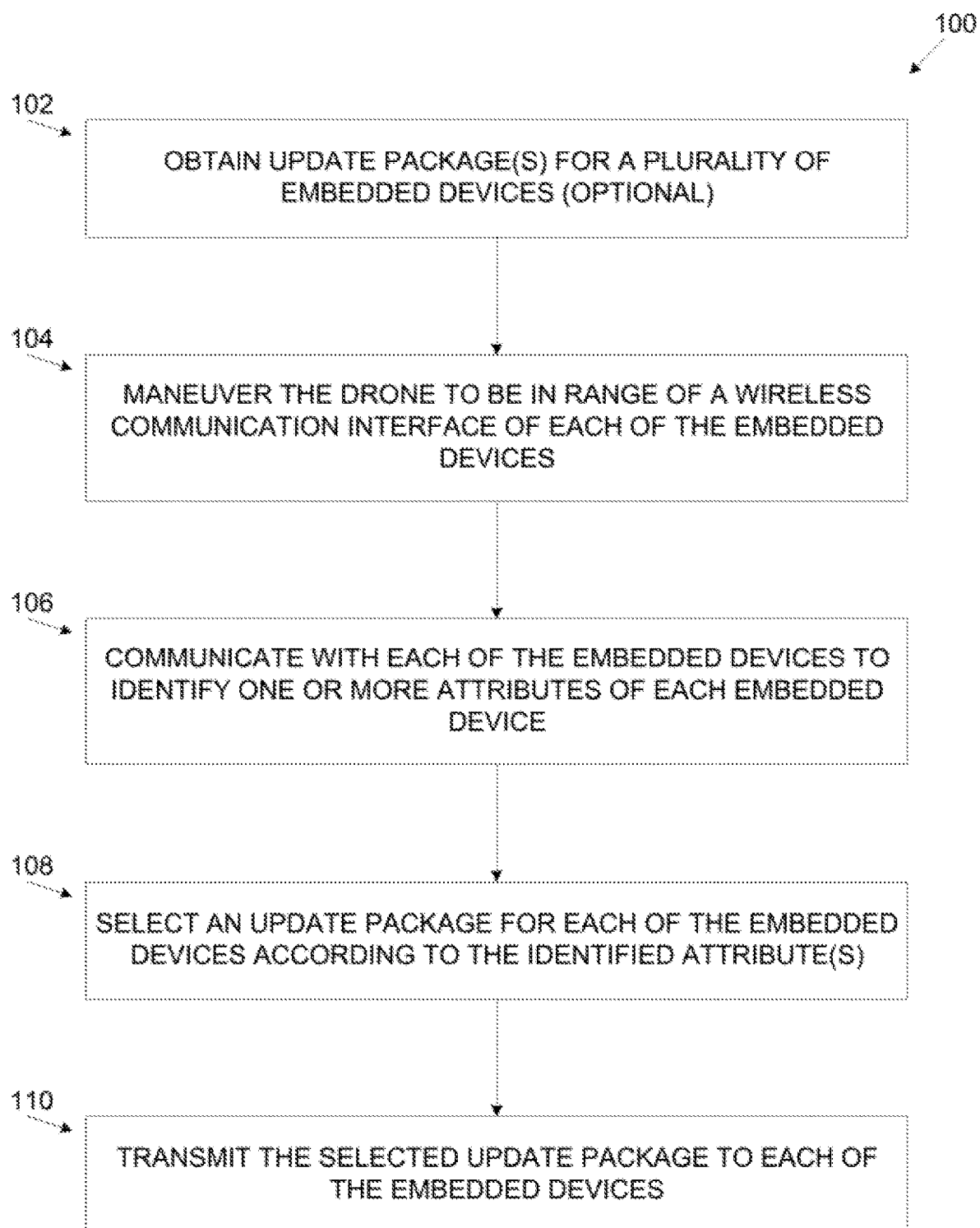
FIG. 1 is a flowchart of an exemplary process of using a drone to provide update packages to embedded devices, according to some embodiments described herein.

Some embodiments described herein relate to providing update packages to embedded devices, and, more specifically, but not exclusively, to providing update packages to embedded devices using a drone.

According to some embodiments described herein, there are provided methods, systems and computer program products for using drones to provide update packages to one or more embedded devices, in particular deployed embedded devices (located in their designated operational location) experiencing limited and/or insecure network connectivity.

The embedded devices may include, for example, IoT devices, sensors, meters, road infrastructure elements, agricultural control devices, industrial control devices, building infrastructure elements, vehicle deployed devices and/or the like. The embedded devices may include one or more processors (e.g. a microprocessor, a microcontroller, etc.) executing one or more executable modules such as, for example, software, firmware, middleware and/or the like (e.g. operating system, application(s), etc.) to control functionality of the respective embedded device. The embedded device(s) may further use one or more non-executable data modules, for example, map data, calibration information and/or the like.

The executable and/or non-executable modules of the embedded devices may need to be updated one or more times during the lifetime of the embedded devices after deployed. The update may be done by providing the embedded device(s) update package(s) which may include a full version update of one or more of the executable and/or non-executable modules and/or a differential update to one or more of the executable and/or non-executable modules already installed in the embedded device(s). Since the embedded devices may vary among themselves, for example, different types, different variants, different vendors and/or the like, the update packages may be configured according to one or more attributes of the embedded devices, for example, a type, a variant, a vendor, a (current) software version, a communication range and/or the like.

The embedded devices include a transceiver for wireless connectivity, for example, Near Field Network (NFC) transceiver, Bluetooth Low Energy (BLE) transceiver, Wireless Local Area Network (WLAN, e.g. Wi-Fi) transceiver, Radio Frequency (RF) transceiver and/or the like. However, the embedded device(s) may optionally be disconnected from a network such as the World Wide Web, a network connecting to a backend service (e.g. infrastructure, architecture, etc.) serving the embedded device(s) and/or a local network.

In some embodiments described herein, the drone is used to provide the update packages to the embedded devices while it is maneuvered to their proximity. In use, the drone is flown, navigated and/or maneuvered, either autonomously and/or remotely to get within wireless range of one or more target embedded devices planned to be updated with a new update package.

Optionally, an estimated update session time may be calculated for a update session in which the update package is provided to one or more of the target embedded devices. The estimated update session time(s) combined with the attributes of the target embedded devices (e.g. type, variant, communication range, etc.) as well as with one or more deployment parameters of the target embedded devices may be used to optimize a flight route for the drone providing the update packages to the target embedded devices. The deployment parameters may include, for example, a number of the target embedded devices, a geographical location of the each of the target embedded devices and/or the like. The flight route may be further optimized according to weather conditions in the area of the target embedded devices.

Along the flight route, optionally predefined, the drone may communicate with the target embedded device(s) to identify one or more attributes of the target embedded device(s), such as, for example, the type, the variant, the vendor, the (current) version of the software package(s), the communication range and/or the like. Based on the identified attribute(s), the drone may select an appropriate update package that fits the functionality, features and/or capabilities of the target embedded device(s).

After selecting the update package(s), the drone may transmit the selected update package(s) to the target embedded device(s) by establishing a communication channel for transmitting the appropriate update package to the target embedded device(s). The drone may remain within the wireless range of the target embedded device(s) until the selected update package(s) is successfully transmitted to the target embedded device(s). In case of a failure in providing the update package(s), the drone may stop the transmission and may optionally communicate with the target embedded device(s) to resume the transmission and/or initiate an additional attempt to deliver the update package(s).

Optionally, the drone simultaneously communicates with multiple target embedded devices, having either similar and/or different attributes to identify them and/or to provide them with the appropriate selected update packages.

In some embodiments described herein, the drone is pre-loaded with a plurality of update packages and/or versions of update packages. Prior to leaving for the update package flight, while in its service area, for example, a docking station, a hangar, a maintenance area and/or the like, the drone may access one or more storage resources to obtain and locally store the update packages for the embedded devices. The pre-loaded update packages may be selected based on a match with the target embedded device(s) found in a planned route for the drone and/or based on update packages which were created following one or more previous update package flights.

The update packages may be stored in one or more storage resources, for example, an attachable storage such as, for example, a disk drive, a memory drive and/or the like. The drone may further download the update packages from one or more networked storage resources, for example, a server, a storage server, a Network Attached Storage (NAS), cloud storage and/or the like. The storage resource(s) may be facilitated through a software repository, for example, a database, a service, an application and/or the like. The storage resource(s) and/or the software repository may be shared by multiple vendors providing software for the embedded devices. The vendors may submit update package(s) in the shared software repository independently and asynchronously from each other. The vendors may also submit update package(s) in the shared software repository asynchronously and regardless of the update activity and/or schedule of the drone. Optionally, one or more of the update packages is encrypted.

The drone may therefore obtain the most recent updates currently available for the target embedded devices planned to be updated.

Optionally, the drone communicates with the storage resource(s) remotely over one or more long range networks to retrieve (obtain) the appropriate update package for one or more of the embedded devices after communicating with the embedded device(s) to identify their attribute(s). Once the attribute(s) of the target embedded device(s) are identified, the drone may remotely access the storage resource(s) to retrieve the update package(s) designed, configured and adapted for the identified embedded device(s).

Optionally, the drone initiates an authentication session with one or more of the embedded devices to validate the identity of the drone to the respective embedded device(s) and/or to validate the identity of the respective embedded device(s) themselves.

Optionally, while the drone is in wireless communication range of one or more of the embedded devices, the drone may relay, collect and/or transfer operational data, for example, sensory data, status data and/or control data between the respective embedded device(s) and a backend operational service, infrastructure, architecture and/or the like serving the respective embedded device(s).

Using the drone to provide update packages to the embedded devices may present significant advantages.

The embedded devices may typically communicate through their wireless interface(s) with a locally deployed gateway connecting the embedded devices to the backend operational service, infrastructure, architecture and/or the like serving the embedded devices through one or more network infrastructures, for example, a Local Area Network (LAN), a Wide Area Network (WAN), a Metropolitan Area Network (MAN), a cellular network and/or the like. However, the wireless interface(s) of the embedded devices may provide limited connectivity inherent by the limited capabilities of the embedded devices, in particular, low power, limited functionality, limited processing resources, limited communication resources and/or the like which typically derive from low cost considerations. In addition, some of the embedded devices may be deployed in limited network coverage areas, for example, rural areas, water bodies, underground locations and/or the like which may impose further limitation on the network connectivity of the embedded devices. Physical access to such areas may be difficult, costly and/or inefficient.

The limited communication resources and/or limited network connectivity may be sufficient for transferring operational data to and/or from the embedded devices. Update packages on the other may be more demanding in utilization of communication resources such as, for example, range, bandwidth, throughput and/or the like. The limited communication resources may therefore impose major restrictions and/or even prevent updating the software of the embedded devices. Never the less, the update packages may be highly desirable and/or essential during the life cycle of the deployed embedded devices to achieve one or more objectives, for example, resolve a bug, adapt to a new operational condition, apply a cyber security measure and/or the like.

Since the drones may be maneuvered to be in range of the embedded devices' wireless interface, using the drones to provide the update packages may easily overcome these limitations. First, connectivity of the embedded devices to the close range drone may be significantly superior to connectivity of the embedded devices to the gateway and/or backend service infrastructure. Moreover, data transmission may be one of the major power consuming applications of the embedded devices. As the drone is maneuvered to be in close range, the embedded device(s) may need to invest significantly reduced power resources to operate their wireless interface, in particular, their transmitters. Furthermore, operating the drone to provide the update packages to a plurality of target embedded devices during a single flight may further reduce costs and complexity of the update session and/or process.

Moreover, by estimating the time of the update session, the flight route of the drone may be optimized such that the drone is efficiently maneuvered between the target embedded devices. The optimized flight route may significantly reduce flight time and/or flight count and hence may significantly reduce costs for operating the drone for the update sessions.

In addition, there may be scenarios in which the network connectivity of the embedded devices through the gateway and/or backend service infrastructure may be compromised by cyber threat(s). Such events may require updating at least some of the embedded devices with a update package, for example, fixing vulnerability, applying a security patch and/or the like. However, using the gateway may be insecure and in some events impossible as the gateway may be rendered useless and/or inaccessible during a cyber-attack. Using the drone to provide the update packages to the embedded devices may therefore bypass the compromised and/or insecure network(s) and possibly apply security measures to reinstitute the compromised network(s) and/or the embedded devices.

Before explaining at least one embodiment in detail, it is to be understood that the embodiment describe herein are not necessarily limited in its application to the details of construction and the arrangement of the components and/or methods set forth in the following description and/or illustrated in the drawings and/or the Examples. The embodiment describe herein are capable of other embodiments or of being practiced or carried out in various ways.

The embodiment describe herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects of embodiments are described herein with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of using a drone to provide update packages to embedded devices, according to some embodiments described herein. An exemplary process 100 may be executed by one or more processors of a drone to provide update packages to a plurality of embedded devices, in particular, embedded devices having wireless network interface(s) but experiencing limited and/or insecure network connectivity.

The drone may obtain one or more update packages for updating one or more executable modules of the embedded device(s), for example, software, firmware, middleware and/or the like. The update packages may also be provided for updating one or more non-executable data modules, for example, map data, calibration information and/or the like. The drone may obtain the update package(s), either a full version update and/or a differential update from one or more storage resources optionally providing a software repository, for example, a database, a service, an application and/or the like. The drone may be maneuvered to the location of each of the embedded devices such that it gets in range of the wireless network interface of a respective embedded device(s). While in range, the drone may communicate with the respective embedded device(s) over the wireless network interface(s) to identify one or more attributes, for example, a type, a variant, a vendor, a software version, a communication capability and/or the like. Based on the identified attribute(s), the drone may select an appropriate update package and transmit it to the respective embedded device(s) over the wireless network interface(s).

Figure 2:
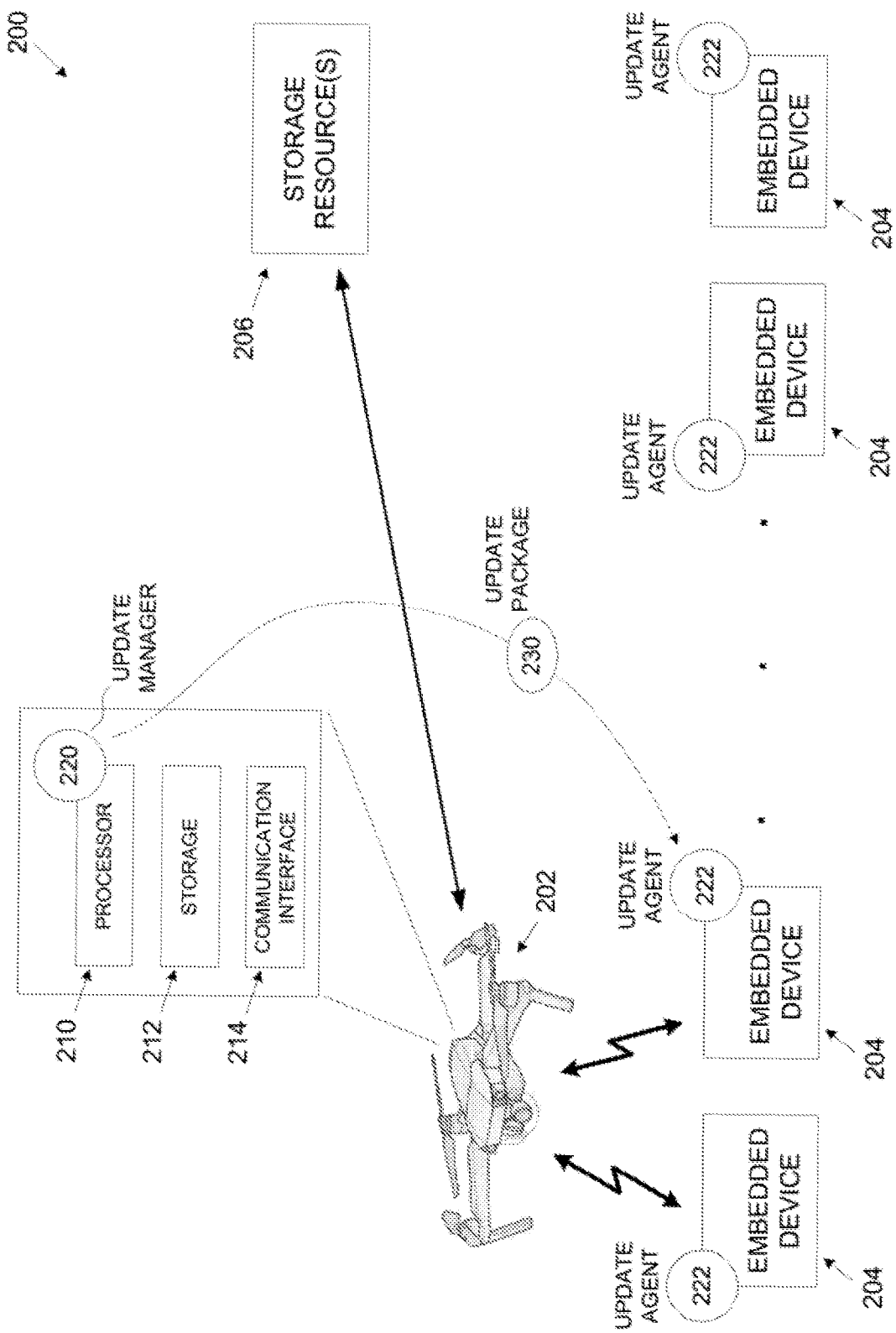
FIG. 2 is a schematic illustration of an exemplary system for using a drone to provide update packages to embedded devices, according to some embodiments described herein.

Reference is also made to FIG. 2, which is a schematic illustration of an exemplary system for using a drone to provide update packages to embedded devices, according to some embodiments described herein. An exemplary system 200 for executing a process such as the process 100 includes a drone 202 capable of maneuvering in communication range of a plurality of embedded devices 204, for example, an IoT device, a sensor, a smart meter, a road infrastructure element, an agricultural control element, an industrial control element and/or the like. The embedded devices 204 may also include vehicle deployed embedded devices, which may be attached, installed and/or integrated in one or more vehicles, for example, an Electric Control Unit (ECU) controlling one of more vehicle systems (e.g. a door lock, a window lift system, an engine control system, a transmission control system, a breaking system, an infotainment system, a navigation system, etc.), an imaging sensor and/or the like.

The embedded devices 204 may be processing devices comprising one or more processors, for example, a microprocessor, a microcontroller, and/or the like executing one or more executable modules, for example, software, firmware, middleware and/or the like (e.g. operating system, application(s), etc.) to control functionality of the respective embedded device 204. The embedded devices 204 may further use one or more non-executable data modules, for example, map data, calibration information and/or the like. The embedded devices 204 have network connectivity capabilities through one or more wireless interfaces, specifically low power wireless interfaces, for example, an NFC interface, a BLE interface, a Wi-Fi interface, an RF interface and/or the like. The embedded devices 204 typically connect to a locally deployed gateway (not shown in the illustration) connecting the embedded devices 204 to one or more servers and/or services over one or more network infrastructures, for example, a LAN, a WAN, a MAN, a cellular network and/or the like.

The embedded devices 204 may be deployed in limited access areas and/or locations, for example, rural areas, water bodies, underground locations, tall and/or elevated infrastructures and/or the like. At least some of these limited access areas may present limited network connectivity, for example, lack and/or limited network infrastructure which in turn may provide limited communication resources (e.g. range, throughput, band width, etc.) and/or the like. The embedded devices 204 are typically low end, low power and/or low cost devices having limited communication resources, for example, range, throughput, band width, transmission session time and/or the like. The limited communication resources of the embedded devices 204 coupled with the potential limited network connectivity may therefore impose major limitations to the connectivity and/or communication activity of the embedded devices 204. While typically sufficient for transferring operational data, the limited network connectivity and/or communication resources available to the embedded devices 204 may restrict and/or prevent online transfer of update packages 230 which may be more demanding in terms of communication resources. The update packages 230 may include an update to one or more software modules and/or program executables of the embedded device(s) 204, for example, software module (e.g. an application, etc.), firmware (e.g. operating system etc.), middleware and/or the like. The update packages 230 may further include an update to one or more of the non-executable data modules stored and used by the embedded device(s) 204, for example, map data, calibration information and/or the like.

The drone 202 includes a processor 210, a storage 212 and a communication interface 214. The processor 210, homogenous or heterogeneous, may include one or more processors arranged for parallel processing, as clusters and/or as one or more multi core processor(s). The storage 212 may include one or more non-transitory persistent storage devices, for example, a hard drive, a Flash array and/or the like. The storage 212 may further include one or more attachable storage devices, in particular persistent storage devices, for example, an attachable hard drive, a memory stick and/or the like. The storage 212 may also include one or more volatile devices, for example, a Random Access Memory (RAM) component and/or the like. The storage 212 may be used to store data as well as software modules, for example, an OS, an application, a tool, an agent, a service, a script and/or the like each comprising a plurality of program instructions that may be executed by the processor 210 from the storage 212. For example, the processor 210 may execute a (software) update manager 220 for providing the update packages 230 to the embedded devices 204. The communication interface 214 may include one or more wireless communication interfaces, in particular communication interfaces compatible with the wireless interface(s) of the embedded devices 204, for example, the NFC interface, the BLE interface, the Wi-Fi interface, the RF interface and/or the like.

While in its service area, for example, a docking station, a hangar, a maintenance area and/or the like, the drone 202, in particular the update manager 220 may access a software storage 206 comprising one or more local and/or remote storage resources, for example, an attachable storage (e.g. a disk drive, a memory drive, etc.), a network storage (e.g. a server, a storage server, a Network Attached Storage (NAS), a cloud storage, etc.) and/or the like to obtain the update packages 230 for one or more of the embedded devices 204. The software storage 206 may be further facilitated through a software repository, for example, a database, a service, an application and/or the like. The update manager 220 may access the software storage 206 over one or more networks, for example, the internet, through one or more network interfaces provided by the communication interface 214, for example, a LAN interface. Optionally, in case the software storage 206 is located in the service area, the update manager 220 may access the software storage 206 over one or more local interfaces provided by the communication interface 214, for example, the LAN interface, a Universal Serial Bus (USB) interface and/or the like.

Additionally and/or alternatively, the update manager 220 may access the software storage 206 remotely through one or more long range wireless interfaces, for example, a Radio Frequency (RF) interface, a cellular interface, a satellite link interface and/or the like available by the communication interface 214 while the drone 202 is airborne. This may be done while the drone 202 is in the service area or after the drone 202 left the service area, for example, the drone 202 is airborne.

Each of the embedded devices 204 may execute one or more software modules, for example, a (software) update agent 222 which may communicate with the update manager 220 over one or more of the wireless interfaces to receive the update package(s) 230. Complexity of the update agent 222 may vary according to the features, functionality and/or capabilities it provides. For example, a simple update agent 222 typically characterized by a very small foot print (memory wise) may support flashing a full version update of the software package. A more advanced update agent 222 on the other hand may support additional update features, such as, for example, differential update of the software package, compression, encryption, authentication and/or the like.

As shown at 102, the process 100 starts with the update manager 220 optionally obtaining one or more of the update packages 230 for the embedded devices 204. The update packages 230 may include updates to one or more executable modules executed by the embedded device(s) 204, for example, a software module, a firmware, a middleware and/or the like (e.g. an operating system, an application, an agent, a tool, a script, etc.).

The update package(s) 230 may further include updates for one or more no-executable data modules used by the embedded device(s) 204, for example, map data, calibration information and/or the like. Each of the update packages 230 may be a full version update of one or more executable and/or non-executable modules (e.g. a new version, an updated version, etc.) for a respective embedded device(s) 204. Additionally and/or alternatively, each of the update packages 230 may be a differential update to one or more executable and/or non-executable modules already installed in the respective embedded device(s) 204. Each of the update packages 230 may be configured according to one or more attributes, for example, a type, a variant, a vendor, a (current) software version, a communication range and/or the like of a respective target embedded device 204, i.e. the embedded device 204 for which the respective update package 230 is intended.

For example, a certain update package 230 may be configured to upgrade a plurality of embedded devices 204 of a certain type and/or embedded devices 204 produced by a certain vendor. In another example, a certain update package 230 may be configured to upgrade every embedded device 204 having a current software version which precedes a certain version. In another example, multiple variants of a certain type of the embedded devices 204 may be deployed where each of the variants may have different functionality, features and/or capabilities.

In such case, multiple versions of the update package 230 may be created for the certain type of embedded devices 204 where each of the versions may be adapted and/or configured for one or more of the variants. In another example, multiple versions of a certain update package 230 may be created for the certain type of embedded devices 204 where a size of each of the versions is different to adapt to given communication resources (e.g. bandwidth, throughput, range, etc.) available to a respective target embedded device 204.

Optionally, one or more of the update packages 230 are encrypted to increase immunity of the update packages 230 to potential malicious interception and/or to improve protection of the embedded devices 204 against malicious cyber-attacks. The encryption may be done using one or more encryption algorithms, for example, public key encryption, private key encryption and/or the like.

The update manager 220 may access the software storage 206 to obtain the update package(s) 230 according to the target embedded device(s) 204 planned to be updated, in particular according to the attribute(s) of the target embedded device(s) 204. The software storage 206 and/or the software repository may be shared by multiple vendors providing software for the embedded devices 204. For example, whenever a certain update package 230 is available from one of the vendors for one or more of the embedded devices 204, the respective vendor(s) may update the software storage 206 with the certain update package 230. The vendors may submit update package(s) 230 in the shared software repository independently and asynchronously from each other.

The vendors may naturally submit the update package(s) 230 in the shared software repository asynchronously and regardless of the update activity and/or schedule of the drone 202. While preparing for an update session, the update manager 220 may therefore obtain the most recent update packages 230 currently available for the embedded device(s) 204 planned to be updated.

The update manager 220 may locally store the obtained update package(s) 230, for example, in the storage 212.

In some embodiments described herein, one or more attachable storage devices pre-loaded with one or more of the update packages 230, for example, a USB memory device and/or the like may be attached to one or more interfaces and/or ports provided by the communication interface 214. The update manager 220 may access the pre-loaded attachable storage device(s) to obtain the stored update package(s) 230.

Optionally, the update manager 220 calculates an estimated update session time for one or more update sessions in which the update packages are provided to the target embedded devices 204.

As shown at 104, the drone 202 is maneuvered to the area and/or location of embedded device(s) 204 that need to be updated with the update package(s) 230. In particular, the drone 202 is maneuvered to be in a wireless communication range of the wireless interface(s) of the embedded device(s) 204 planned to be updated. The drone 202 may be controlled by one or more software modules, for example, a control application that control flight, movement, navigation and/or like executed by the processor 210. The control application may communicate with a remote controller (user and/or automated system) to receive flight, movement and/or navigation instructions.

Optionally, the control application may be at least partially automated to control the drone 202 with limited and/or no instructions from the remote controller. For example, the control application may be programmed with the geographical location coordinates of the embedded device(s) 204, the wireless communication range of the embedded device(s) 204 and/or the like and may autonomously fly, navigate and/or maneuver the drone 202 into the wireless communication range of the embedded device(s) 204.

Optionally, the service area of the drone 202 is utilized in a hosting vehicle, for example, an aerial vehicle (e.g. a plane, another drone, a helicopter, etc.), a naval vehicle (e.g. a boat, a ship, etc.), a ground vehicle (e.g. a car, a track, etc.) to extend the range of the drone 202, to support field service and/or the like. The drone may be serviced, launched and/or re-launched from the hosting vehicle that may be located in significant proximity to the embedded device(s) 204 to which the update package(s) 230 is to be delivered. While in the service area of the hosting vehicle, the drone 202 may be fueled, maintained and/o the like. Moreover, while the drone 202 is in the service area of the hosting vehicle, the update manager 220 may obtain and locally store one or more of the update packages 230.

As shown at 106, the update manager 220 communicates with one or more of the embedded devices 204 over their wireless interface(s) to identify one or more attributes of the embedded device(s) 204. In particular, the update manager 220 may communicate with the update agent 222 executed by the respective embedded device(s) 204.

During the communication session, the update manager 220 may identify, for example, the type, the variant, the vendor, the software package version, the communication resources availability and/or the like of the respective embedded device(s) 204. The update manager 220 may store the identified attribute(s) associated with each of the respective embedded devices 204. The stored attribute(s) may be used to select the update packages 230 for the respective embedded devices 204 in future software update flights of the drone 202 and/or another drone such as the drone 202.

As shown at 108, the update manager 220 selects one of the update packages according to the one or more of the attributes identified for the respective embedded device(s) 204. The selected update package is typically designed, configured and/or adapted according to the characteristics, functionality, features and/or the like of the specific respective embedded device(s) 204 as identified by the detected attribute(s).

As shown at 110, the update manager 220 transmits the selected update package 230 to the respective embedded device(s) 204. The update manager 220 may communicate with the update agent 222 of the respective embedded device(s) 204 over the wireless interface(s) to provide the update package 230 to the update agent 222. The update package 222 may then apply the update package 230 to the respective embedded device 204.

Optionally, the update manager 220 may communicate with the software storage 206 to obtain the update package 230 for one or more of the embedded devices 204 while the drone 202 is airborne. The update manager 220 may communicate with the software storage 206 through one or more of the long range wireless interfaces available by the communication interface 214. After identifying the attribute(s) of the respective embedded device(s) 204, the update manager 220 may access the software storage 206 to obtain the appropriate update package(s) 230 designed, configured and/or adapted according for the embedded device(s) 204 as identified by the detected attribute(s).

Optionally, the update manager 220 communicates simultaneously with multiple target embedded devices 204 to provide them with the update package(s) 230. The control application may maneuver the drone 202 to a location which is within the wireless communication range of multiple target embedded devices 204. The update manager 220 may then communicate simultaneously with the multiple target embedded devices 204 to identify them and provide them with the appropriate selected update package 230. One or more of the multiple target embedded devices 204 may have similar attributes thus the update manager 220 may provide them with the same selected update package 230. However, at least some of the multiple target embedded devices 204 may have different attributes which may require the update manager 220 to provide them with different update package 230 selected according to their specific attribute(s).

The update manager 220 may apply one or more communication protocols to communicate with the multiple target embedded devices 204, for example, a broadcasting protocol, a unicast protocol and/or the like. Moreover, the update manager 220 may use multiple wireless interfaces, ports and/or channels provided by the communication interface 214 to communicate with the multiple target embedded devices 204. For example, assuming several target embedded devices 204 have the same attributes.

The update manager 220 may therefore select the same update package 230 to be provided to them. In such case, assuming the drone 202 is maneuvered to be within the communication range of these target embedded devices 204, the update manager 220 may broadcast the selected update package 230 such that it is received by multiple target embedded devices 204. In another example, some of the target embedded devices 204 may present different attributes such that the update manager 220 selects different update packages 230 to be provided to them. In this case, assuming the drone 202 is maneuvered to be within the communication range of these target embedded devices 204, the update manager 220 may simultaneously transmit the different selected update package 230 to each of the respective target embedded devices 204.

The simultaneous transmission may be utilized through separate communication interfaces, ports and/or channels available in the communication interface 214. The simultaneous transmission may also be utilized through a single communication interface where each of the target embedded devices 204 has a unique address and each transmission packet is assigned with the address of the respective target embedded device 204 to which the packet is directed.

Optionally, the update manager 220 communicates with one or more distributing embedded devices which may distribute the update package(s) 230 to one or more other of the target embedded devices 204, in particular, to target embedded devices 204 located in close proximity and hence in wireless range of each other.

The distributing embedded device may be, for example, the gateway of the embedded devices 204, a dedicated device and/or one of the embedded devices 204. After identifying the attribute(s) of the target embedded devices 204, the update manager 220 may select one or more update packages 230 for the target embedded device(s) 204 and transmit them to the distributing embedded device. The distributing embedded device may then transmit a respective selected update package 230 to each of the target embedded device(s) 204. Optionally, in order to identify the attribute(s) of one or more of target embedded devices 204, the update manager 220 communicates with theses target embedded device(s) 204 through the distributing embedded device serving as a bridging device.

Optionally, a flight route of the drone 202 is optimized according to the estimated update session times calculated by the update manager 220. The flight route optimization may be done in advance prior to launching the drone 202 and may be pre-defined for the control application. Additionally and/or alternatively, the control application itself optimizes the flight route. The estimated update session times may be assessed in combination with the attributes of the target embedded devices 204 and/or one or more deployment parameters of the target embedded devices 204. The deployment parameters may include, for example, a number of the target embedded devices 240, a geographical location of the each of the target embedded devices 240 and/or the like. The flight route of the drone 202 may be further optimized according to weather conditions in the area of the target embedded devices 204.

For example, assuming a first group of target embedded devices 204 are located in a first geographical area and a second group of target embedded devices 204 are located in a second geographical area. Initially, the estimated update session times may be used to determine whether the drone 202 is capable of reaching and providing the selected update packages 230 to all the target embedded devices 204, some of them and/or none of them. Assuming the drone 202 is capable of the task, the flight route may be optimized by maneuvering the drone 202 to the first geographical area where the update manager 220 provides the update packages to the first group of target embedded devices 204. The drone 202 may then be maneuvered to the second geographical area where the update manager 220 provides the update packages to the second group of target embedded devices 204.

In another example,

Optionally, the update manager 220 initiates an authentication session with one or more of the embedded devices 204 prior to transmitting the update package(s) 230 to the embedded device(s) 204. This may be done to increase immunity of the embedded device(s) 204 to cyber-attacks of potential malicious attackers, for example, malicious drones. The authentication session may be based, for example, on public/private key encryption algorithms. For example, assuming the update manager 220 is familiar with a private key of a certain embedded device 204, the update manager 220 may initiate the authentication session in which messages are encrypted using the private key which only the certain embedded device 204 may decrypt. In another example, a certain embedded device 204 may validate an identity of the drone 202. The update manager 220 may provide an identity key to the update agent 222 executed by the certain embedded device 204. The update agent 222 may then communicate over its wireless interface(s) with one or more remote resources, for example, a server, a website, a service, an application and/or the like to validate the identity key of the drone 202.

Optionally, the update manager 220 encrypts the one or more of the update packages 230 before transmitting it to one or more of the embedded devices 204. This may be done to further increase immunity of the embedded device(s) 204 to cyber-attacks of potential malicious attackers, for example, the malicious drones. The update package(s) 230 may be encrypted using, for example, public/private key encryption algorithms.

Optionally, the update manager 220 and/or one or more other software modules executed by the processor 210 of the drone 202 collect operational data from the embedded device(s) 204 while in range of the wireless interface(s) of one or more of the embedded device(s) 204. The collected data may include, for example, sensory data of a sensor and/or a meter type embedded device(s) 204, status data of an IoT type embedded device(s) 204 and/or the like. The collected data may be stored locally in the drone 202, for example, in the storage 212. When the drone 202 returns to the service area, the collected data may be uploaded to one or more remote locations, for example, a server, a service, an operational center and/or the like providing, for example, a backend operational service, an infrastructure, a data collection architecture and/or the like serving the embedded device(s) 204. Optionally, the collected data is transmitted to the remote location(s) over the long range wireless interfaces of the communication interface 214 while the drone 202 is still airborne.

Optionally, while the drone 202 is in range of the wireless interface of one or more of the respective embedded device(s) 204, the update manager 220 and/or one or more other software modules executed by the processor 210 of the drone 202 relay control data from the remote location(s) to the respective embedded device(s) 204. The control data may include, for example, operational mode setting, configuration parameters and/or the like that may be applied to the respective embedded device(s) 204.

It is expected that during the life of a patent maturing from this application many relevant systems, methods and computer programs will be developed and the scope of the terms IoT device and wireless communication interface are intended to include all such new technologies a priori.

As used herein the term "about" refers to □ 10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiment described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features described herein, which are, for clarity, described in the context of separate embodiments, may also be provided in combination in a single embodiment. Conversely, various features of the embodiment describe herein, which are, for brevity, described in the context of a single embodiment, may also be provided separately or in any suitable subcombination or as suitable in any other described embodiment describe herein. Certain features described in the context of various embodiments are not to be considered essential features of those embodiments, unless the embodiment is inoperative without those elements.

Although the embodiment describe herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiment describe herein. To the extent that section headings are used, they should not be construed as necessarily limiting.

What is claimed is:

1. A computer implemented method of using a drone to provide update packages to embedded devices, comprising:
   using at least one processor mounted on a drone to execute code that when executed by said at least one processor, causes said at least one processor to conduct the steps of:
      maneuvering the drone to be in range of at least one wireless interface of each of a plurality of embedded devices;

providing an identity of the drone to the each embedded device to be validated by the each embedded device, as part of an authentication session;

communicating with the each embedded device through the at least one wireless interface to identify at: least one attribute presented by the each embedded device;

selecting one of a plurality of update packages according to the at least one identified attribute; and transmitting the selected update package to the each embedded device through the at least one wireless interface;

wherein for each respective embedded device, said authentication session and said transmitting of the selected update package are conducted using a same wireless interface, wherein the same wireless interface is the at least one wireless interface.

2. The computer implemented method of claim 1, wherein the each embedded device is selected from a group consisting of: an Internet of Things (IoT) device, a sensor, a meter, a road infrastructure element, an agricultural control device, an industrial control device and a vehicle deployed device.

3. The computer implemented method of claim 1, wherein the at least one attribute is selected from a group consisting of: a type, a variant, a vendor, a software version and a communication capability of the at least one wireless interface.

4. The computer implemented method of claim 1, wherein the update package is a member of a group consisting on a full version update and a differential update.

5. The computer implemented method of claim 1, wherein the selected update package is obtained from a local storage resource of the drone.

6. The computer implemented method of claim 1, wherein the selected update package is obtained from a remote storage resource over at least one long range wireless interface of the drone.

7. The computer implemented method of claim 1, wherein the update package is obtained from a shared repository storing a plurality of update packages for at least some of the plurality of embedded devices.

8. The computer implemented method of claim 7, further comprising each of the plurality of update packages is provided by a respective vendor independently of other update packages of the plurality of update packages.

9. The computer implemented method of claim 1, further comprising optimizing a flight route of the drone according to an estimated update session time for providing the update package to at least one of the plurality of embedded devices.

10. The computer implemented method of claim 1, wherein the at least one processor further conducts the step of providing simultaneously respective the selected update package to multiple embedded devices of the plurality of embedded devices by maneuvering the drone to he within range of the at least one wireless interface of the multiple embedded devices and communicating simultaneously with the multiple embedded devices to provide the respective selected update package to each of the multiple embedded devices.

11. The computer implemented method of claim 1, further comprising the transmitting comprises broadcasting the selected update package such that the selected update package is received by multiple embedded devices.

12. The computer implemented method of claim 1, further comprising encrypting the update package prior to the transmitting of the update package.

13. The computer implemented method of claim 1, wherein the each embedded device validates the identity of the drone according to authentication data obtained from a remote secure resource.

14. The computer implemented method of claim 1, further comprising collecting operational information from at least one of the plurality of embedded devices.

15. The computer implemented method of claim 14, wherein the collected operational information is transmitted to at least one remote operational center over at least one long range wireless interface of the drone.

16. The computer implemented method of claim 14, wherein the collected operational information is stored in a storage resource of the drone and uploaded to at least one remote operational center at a later time.

17. A system for using a drone to provide update packages to embedded devices, comprising:

at least one processor mounted on a drone and executing code, the code comprising:

code instructions to maneuver the drone to be in range of at least one wireless interface of each of a plurality of embedded devices;

code instructions to provide an identity of the drone to the each embedded device to be validated by the each embedded device, as part of an authentication session;

code instructions to communicate with the each embedded device through the at least one wireless interface to identify at least one attribute presented by the each embedded device;

code instructions to select one of a plurality of update packages according to the at least one identified attribute; and code instructions to transmit the selected update package to the each embedded device through the at least one wireless interface;

wherein for each respective embedded device, said authentication session and transmitting of the selected update package are conducted using a same wireless interface, wherein the same wireless interface is the at least one wireless interface.

18. The computer implemented method of claim 1 further comprising validating an identity of the each embedded device through said authentication session.

19. The system of claim 17, wherein the each embedded device validates the identity of the drone according to authentication data obtained from a remote secure resource.

* * * * *